US008470070B2

(12) United States Patent  
Kulkarni et al.

(10) Patent No.: US 8,470,070 B2  
(45) Date of Patent: Jun. 25, 2013

(54) ASH DETECTION IN DIESEL PARTICULATE FILTER

(75) Inventors: Vadiraj P. Kulkarni, Dunlap, IL (US); Matthew E. Leustek, Metamora, IL (US); Sara K. Michels, Metamora, IL (US); Rajesh N. Nair, Peoria, IL (US); Michael A. Snopko, Washington, IL (US); Andrew A. Knitt, Deer Creek, IL (US)

(73) Assignee: Caterpillar Inc., Peoria, IL (US)

( * ) Notice: Subject to any disclaimer, the term of this patent is extended or adjusted under 35 U.S.C. 154(b) by 377 days.

(21) Appl. No.: 12/841,308

(22) Filed: Jul. 22, 2010

(65) Prior Publication Data

US 2012/0017570 A1 Jan. 26, 2012

(51) Int. Cl.
*B01D 39/06* (2006.01)
*B01D 39/14* (2006.01)
*B01D 50/00* (2006.01)
*B01D 46/46* (2006.01)
*F01N 3/02* (2006.01)
*F01N 3/00* (2006.01)

(52) U.S. Cl.
USPC .......... 95/8; 55/522; 55/523; 55/524; 60/277; 60/311; 422/169; 422/170; 422/171; 422/172; 422/177; 422/178; 422/179; 422/180; 422/181; 422/182

(58) Field of Classification Search
USPC .............. 55/522–524; 95/8; 60/277, 311; 422/169–172, 177–182
See application file for complete search history.

(56) References Cited

U.S. PATENT DOCUMENTS

| | | | |
|---|---|---|---|
| 4,477,771 A | 10/1984 | Nagy et al. | |
| 5,157,340 A | 10/1992 | Walton et al. | |
| 5,177,444 A | 1/1993 | Cutmore | |
| 5,497,099 A | 3/1996 | Walton | |
| 6,240,722 B1 | 6/2001 | Busch et al. | |
| 7,157,919 B1 | 1/2007 | Walton | |
| 7,253,641 B2 | 8/2007 | Knitt et al. | |
| 7,260,930 B2 | 8/2007 | Decou et al. | |
| 7,677,031 B2 * | 3/2010 | Knitt | 60/295 |
| 8,210,033 B2 * | 7/2012 | Kondo et al. | 73/114.69 |
| 2008/0018442 A1 | 1/2008 | Knitt | |
| 2008/0048681 A1 | 2/2008 | Birkhofer et al. | |
| 2008/0059093 A1 | 3/2008 | Bromberg et al. | |
| 2010/0101409 A1 | 4/2010 | Bromberg et al. | |
| 2010/0102828 A1 | 4/2010 | Bromberg et al. | |

* cited by examiner

*Primary Examiner* — Amber Orlando
(74) *Attorney, Agent, or Firm* — Liell & McNeil (57) ABSTRACT

Detecting ash in a diesel particulate filter includes receiving data indicative of signal attenuation for ash-responsive and ash-insensitive RF signals transmitted through a diesel particulate filter containing trapped soot and ash. A difference between the RF signals, such as a difference in signal attenuation, may be leveraged to detect a relative ash loading state or a change in relative ash loading state of the diesel particulate filter, and responsively indicate that filter cleaning is needed.

20 Claims, 3 Drawing Sheets

ASH DETECTION IN DIESEL PARTICULATE FILTER

TECHNICAL FIELD

The present disclosure relates generally to ash detection strategies used in connection with diesel engines, and relates more particularly to correlating ash-responsive RF signal characteristics with ash loading in a diesel particulate filter.

BACKGROUND

Diesel particulate filters are used in many diesel engine systems to trap particulates generated during the combustion of hydrocarbon fuels such as conventional diesel fuel, bio-diesel, and various blends. These particulates can include a variety of organic and inorganic species, with soot and ash being of particular interest. A typical design employs a filter medium such as a ceramic or metallic medium positioned within a filter body and adapted to trap particulates carried in the exhaust stream between an inlet and an outlet of the filter.

Diesel particulate filters are often classified based on whether they "actively" or "passively" regenerate in response to soot accumulation. Regeneration generally involves inducing combustion of soot accumulated in the filter medium. In active regeneration, some external mechanism such as the introduction of a combustible fuel into the exhaust gas stream is used to raise a temperature within the filter to a point sufficient to induce combustion of the soot. In passive systems, catalysts are often used to promote combustion of accumulated soot under more ordinary filter operating temperatures. In either case, regeneration of the filter tends to do little, if anything, to remove accumulated ash. Since ash tends to accumulate much more slowly than soot, diesel particulate filters are typically cleaned of ash when the diesel particulate filter is removed from service for maintenance or other purposes.

Cleaning ash from a diesel particulate filter tends to be a relatively labor intensive process. While certain strategies have been proposed for actually monitoring accumulation of ash, they are not without shortcomings. As a result, maintenance technicians may find that filters removed from an engine for ash removal may be overloaded or under loaded. Either case is undesirable, as an under-loaded filter may not need to have been removed, and an overloaded filter may be negatively affecting performance. The use of alternative fuels can exacerbate imperfections in conventional ash monitoring or modeling strategies. For example, bio-diesel fuels and blends tend to generate a relatively greater amount of ash then conventional diesel fuels. A viable ash sensing strategy has thus long been sought.

U.S. Pat. No. 7,157,919 to Walton discloses a method and system for detecting soot and ash concentrations in a filter. Walton proposes measuring ash build-up within a diesel particulate filter via the use of RF signals transmitted through the filter after filter regeneration. Walton indicates that after soot has been oxidized and a clean filter remains hot following regeneration, the higher temperatures can increase an "ash loss factor." Consequently, discriminating between a hot, clean filter and a filter loaded with ash appears possible, at least in the context of Walton's technique.

SUMMARY

In one aspect, a method of detecting ash in a diesel particulate filter includes transmitting an ash-responsive RF signal through a diesel particulate filter containing both soot and ash. The method further includes attenuating the transmitted RF signal in response to both of the soot and ash, and generating a filter cleaning alert via an indicating device located in an operator control station of a machine, responsive to attenuating the transmitted RF signal.

In another aspect, a method of determining an ash loading state of a diesel particulate filter includes transmitting an ash-responsive RF signal through a filter medium of a diesel particulate filter containing both soot and ash, and transmitting an ash-insensitive RF signal through the filter medium. The method further includes receiving data indicative of signal attenuation of the ash-responsive RF signal, and data indicative of signal attenuation of the ash-insensitive RF signal. The method further includes comparing the data for the ash-responsive RF signal with the data for the ash-insensitive RF signal, and outputting an ash loading status signal responsive to a difference between the data for the ash responsive RF signal and the data for the ash-insensitive RF signal.

In still another aspect, a method of operating a machine having an internal combustion diesel engine and a diesel particulate filter includes transmitting an ash-insensitive RF signal through the diesel particulate filter, and transmitting an ash-responsive RF signal through the diesel particulate filter. The method further includes attenuating each of the ash-insensitive RF signal and the ash-responsive RF signal, and detecting trapped ash in the diesel particulate filter responsive to a difference in attenuation between the ash-responsive RF signal and the ash-insensitive RF signal.

In still another aspect, a diesel particulate filter system includes a filter housing having an exhaust inlet, and an exhaust outlet, and a filter medium positioned within the filter housing between the exhaust inlet and the exhaust outlet. The filter medium is configured to trap soot and ash from operating an internal combustion diesel engine fluidly connected with the exhaust inlet. The filter system further includes an RF transmitter configured to transmit RF signals through the filter medium, and an RF sensor configured to sense RF energy transmitted through the filter medium. The filter system still further includes an electronic control unit coupled with the RF transmitter and the RF sensor, and being configured to receive data from the RF sensor indicative of signal attenuation of ash-responsive RF signals and ash-insensitive RF signals transmitted through the filter medium during a soot loading cycle. The electronic control unit is further configured to compare the data for the ash-responsive RF signals with the data for the ash-insensitive RF signals and responsively output a filter ash loading status signal.

DETAILED DESCRIPTION

Figure 1:
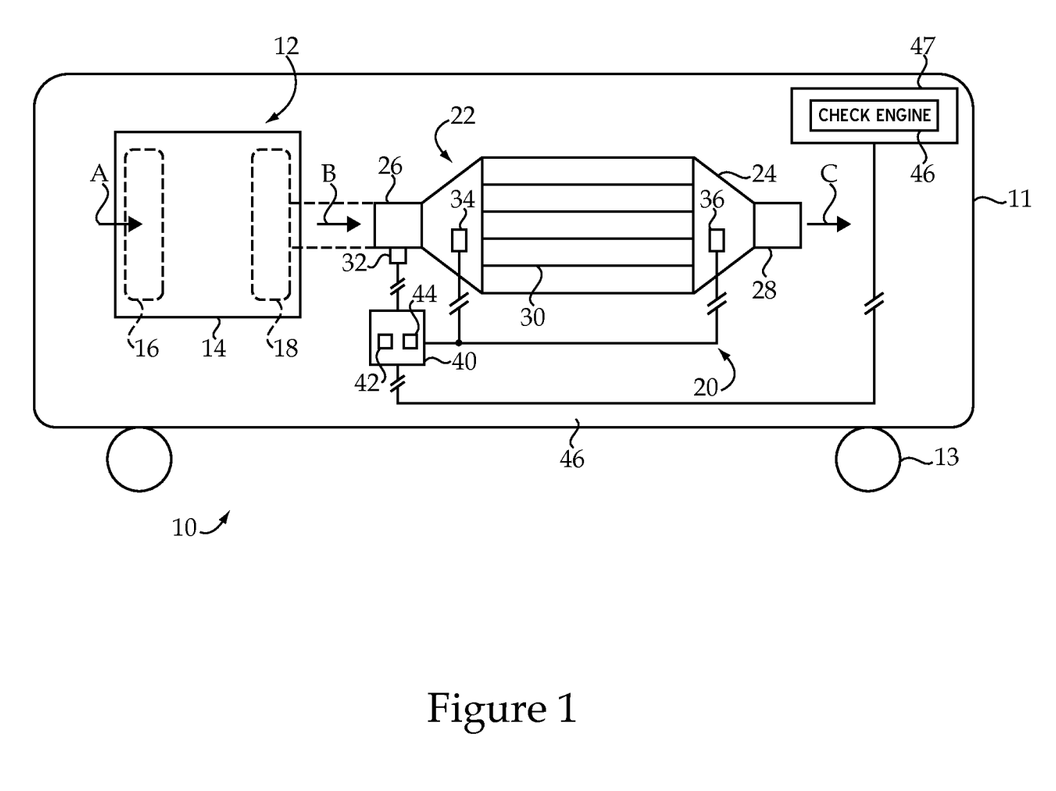
FIG. 1 is diagrammatic view of a machine according to one embodiment.

Referring to FIG. 1, there is shown a machine 10 according to one embodiment. Machine 10 may include a mobile machine such as an on-highway or off-highway truck having a frame 11 and a set of ground engaging propulsion elements 13 coupled with frame 11. Machine 10 might include another mobile machine such as a motor grader, a compactor, a scraper, a tractor, or even a bus or recreational vehicle. In other embodiments, machine 10 might include a stationary machine such as a genset, a pump, a compressor, or any of a variety of other stationary machines.

Machine 10 may include an internal combustion engine system 12, such as a compression ignition diesel engine system, mounted to frame 11. Engine system 12 may include an engine 14 having an intake manifold 16 and an exhaust manifold 18 coupled therewith. Machine 10 may further include a diesel particulate filter system 20 having a diesel particulate filter 22. Filter 22 may include a filter body 24 having an exhaust inlet 26 fluidly connected with exhaust manifold 18, and an exhaust outlet 28. A turbocharger or other exhaust system components may be positioned fluidly between exhaust manifold 18 and exhaust inlet 26. In FIG. 1, arrows A, B and C identify an approximate flow path for gases entering engine 14, passing into exhaust inlet 26, and thenceforth passing out of exhaust outlet 28. A filter medium 30 such as a ceramic or metallic filter medium may be positioned within filter body 24 to trap particulates in exhaust gases passing between exhaust inlet 26 and exhaust outlet 28.

Diesel particulate filter system 20 may further include a regeneration initiation mechanism 32 coupled with exhaust inlet 26 or positioned upstream thereof, and configured to initiate regeneration of filter 22 to combust accumulated particulates in filter 22 in a known manner. In one embodiment, regeneration initiation mechanism 32 might include an injection mechanism configured to supply a fuel and combustion air into a stream of exhaust gases entering filter 22. In other embodiments, another regeneration initiation mechanism such as an electric heater and igniter might be used, or a dosing system configured to inject fuel and a catalyst into the exhaust gases. Still other strategies include back pressure increasing mechanisms, or engine operating strategies which increase exhaust temperatures sufficiently to initiate combustion of trapped soot. Regeneration initiation mechanism 32 may also include a temperature sensor or other sensing/monitoring hardware to enable determination of an inlet temperature of filter 22. In some instances, it may be desirable to gather data for use in determining ash loading during times when filter 22 is not regenerating, and a temperature sensor could be used for this purpose.

Diesel particulate filter system 20 may further include an electronic control unit 40 which includes a processor 42 and a computer readable memory 44 coupled with processor 42. Memory 44 may store computer executable instructions including an ash monitoring routine and/or a soot monitoring routine for monitoring ash and/or soot loading in diesel particulate filter 22, as further described herein. Diesel particulate filter system 20 may further include an indicating device 46 such as a filter service indicator controllably coupled with electronic control unit 40. In one embodiment, device 46 may include a check engine light positioned in an instrument panel within an operator control station 47 such as a cab of machine 10.

Diesel particulate filter system 20 may further include a first radio frequency (RF) transmitter/sensor 34, and a second radio frequency (RF) transmitter/sensor 36. Those skilled in the art will appreciate that certain RF devices may be used to both transmit RF and sense transmitted RF, thus a system might include one RF transmitter/sensor and be fairly understood to include both an RF transmitter and an RF sensor. Sensing of transmitted RF may include sensing RF transmitted from another transmitter, or sensing reflected RF transmitted by the same transmitter, or both. Thus, in one embodiment sensor/transmitter 34 may transmit RF signals through filter medium 30, and the transmitted RF signals may be sensed by sensor/transmitter 36. The roles of sensor/transmitter 34 and sensor/transmitter 36 might also be reversed. In still other embodiments, each of sensor/transmitter 34 and sensor/transmitter 36 might be used to both transmit and receive RF signals. The sensed RF signals may be reflected RF signals, or non-reflected RF signals. It should thus be appreciated that a variety of RF transmission and sensing strategies might be used in diesel particulate filter system 22, and the present disclosure is not limited to any particular set-up. For the sake of convenience, first transmitter/sensor 34 is referred to hereinafter as RF transmitter 34 and second RF transmitter/sensor 36 is referred to hereinafter as RF sensor 36, however the present disclosure is not thereby limited.

Electronic control unit 40 may be coupled with each of RF transmitter 34 and RF sensor 36. In one embodiment, RF transmitter 34 may be controlled via electronic control unit 40 to transmit RF frequency bands including a plurality of different RF frequencies through diesel particulate filter 22. RF sensor 36 may be configured to sense the transmitted RF frequency bands and output corresponding sensor data to electronic control unit 40.

During operating machine 10 and generating exhaust gases with engine 14, diesel particulate filter 22 traps particulates such as soot and ash carried in the exhaust gases. The particulates may be trapped within filter medium 30 in a conventional manner. RF signals transmitted through diesel particulate 22 may attenuate due to the presence of particulates trapped in filter medium 30. This phenomenon is leveraged in certain known particulate monitoring strategies to enable the monitoring of soot accumulation within a filter medium. In the present disclosure, soot loading in filter medium 30, as indicated by signal attenuation of RF signals transmitted through filter medium 30, may be used to time regeneration cycles of diesel particulate filter 22 with regeneration initiation mechanism 32. Electronic control unit 40 may output regeneration initiation commands to regeneration initiation mechanism 32 to switch mechanism 32 from an off state to an on state, for example, or to activate a fuel injector. Strategies have been proposed, as discussed above, for leveraging RF signal attenuation to detect ash. As will be further apparent from the following description, however, such earlier proposals differ from the present disclosure, and may be inferior in at least certain cases.

Figure 2:
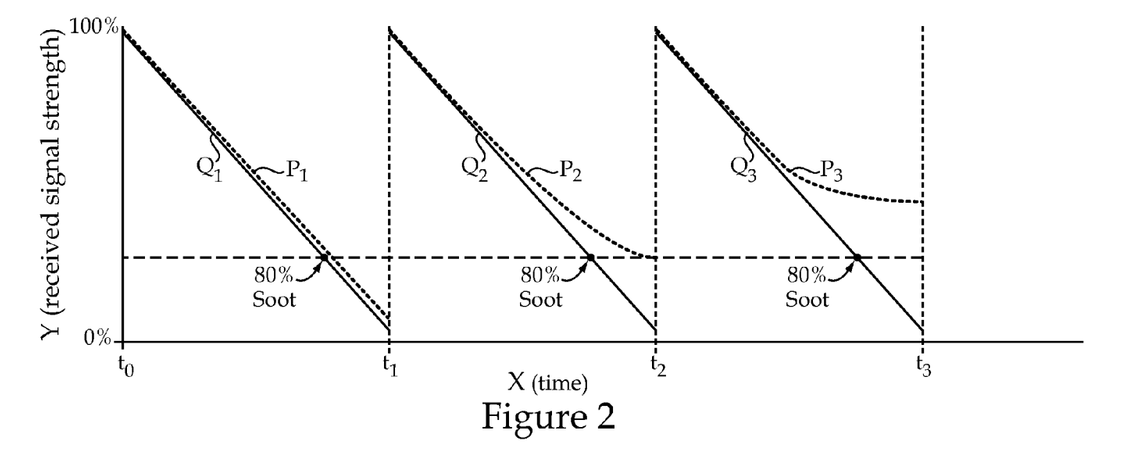
FIG. 2 is a graph illustrating RF signal characteristics over time during operating an engine system having a diesel particulate filter, according to one embodiment.

Referring now to FIG. 2, there is shown a graph illustrating a received signal strength over time for RF transmissions through diesel particulate filter 22. A plurality of times, $t_1$, $t_2$ and $t_3$, are indicated on the X-axis and correspond to execution of filter regeneration cycles. Those skilled in the art will appreciate that filter regeneration cycles do not take place instantaneously, however, the graph of FIG. 2 depicts them as such for simplicity. A plurality of different RF signals are depicted in FIG. 2. The RF signals include a first soot-responsive RF signal $Q_1$, a second soot-responsive RF signal $Q_2$, and a third soot-responsive RF signal $Q_3$. Each of RF signals $Q_1$, $Q_2$, and $Q_3$, may include signals which are not only soot-responsive, but also relatively ash-insensitive, the significance of which will be further apparent from the following description. While signals $Q_1$, $Q_2$, and $Q_3$ are illustrated as separate signals, they might be different time periods of a continuous RF transmission. Further each "signal" $Q_1$, $Q_2$, and $Q_3$ might also be understood to include multiple "signals." For example, any of $Q_1$, $Q_2$, and $Q_3$ could be understood to include multiple signals, defined as portions of a continuous transmission during different time periods. Similar characterization of other signals, further described herein, might be made.

It should thus be understood that the term "RF signal" may include either continuous or non-continuous RF transmissions, at one RF frequency or in a band including multiple RF frequencies, for example. For example, a single RF transmission at "X" MHZ, for "Y" milliseconds may fairly be considered an "RF signal" within the present context. Simultaneous RF transmissions at each of "X, Y, and Z" MHz, for "Y+1" milliseconds, may also be fairly considered an "RF signal." Other combinations of multiple frequency or single frequency, and continuous transmission or non-continuous transmission, may also be considered "RF signals" in the present context. The particular RF signal transmission and sensing protocol which is used may depend at least in part upon what signal processing strategy is employed. For descriptive purposes, each of the RF transmissions or series of transmissions represented as $Q_1$, $Q_2$, and $Q_3$, and $P_1$, $P_2$, and $P_3$, in FIG. 2, is referred to as one RF signal.

As noted above, RF signal attenuation may be used to calculate, estimate or infer a relative soot loading state of a diesel particulate filter. Each of the curves corresponding to RF signals in FIG. 2 may be understood as a representation of received signal strength as indicated by RF sensor 36 over time, and normalized for illustrative purposes. Thus, actual sensor data might appear quite different, and likely noisier. It will be recalled that each of times $t_1$, $t_2$, and $t_3$ represents execution of a filter regeneration cycle. Accordingly, each of signals $Q_1$, $Q_2$, and $Q_3$, may be transmitted and sensed during three different soot loading cycles. Each respective soot loading cycle may begin at a lower soot condition at an earlier time, and transition to a higher soot condition at a later time, upon or after which regeneration may be initiated. Thus, the curves corresponding to signals $Q_1$, $Q_2$, and $Q_3$, may be understood as inversely related to soot loading.

Also shown in FIG. 2 are a first ash-responsive RF signal $P_1$, a second ash-responsive RF signal $P_2$, and a third ash-responsive RF signal $P_3$. Signal $P_1$ may be transmitted during the first soot loading cycle, prior to executing a first regeneration cycle at time $t_1$. Signal $P_2$ may be transmitted during the second soot loading cycle, after executing the first regeneration cycle and prior to executing another regeneration cycle, or a second regeneration cycle, at time $t_2$. Signal $P_3$ may be transmitted during the third soot loading cycle, after executing the second regeneration cycle and prior to executing another regeneration cycle, or a third regeneration cycle, at time $t_3$. Analogous to signals $Q_1$, $Q_2$, and $Q_3$, a continuous RF transmission may comprise signals $P_1$, $P_2$, and $P_3$. Likewise, each of signals $P_1$, $P_2$, and $P_3$, could be understood to include multiple signals. Each of the three soot loading cycles depicted in FIG. 2 may include temporally adjacent soot loading cycles. Thus, the soot loading cycle from time $t_1$ to time $t_2$ may be a next soot loading cycle following the soot loading cycle from time $t_0$ and time $t_1$, and the soot loading cycle from time $t_2$ to time $t_3$ may be a next soot loading cycle following the soot loading cycle from time $t_1$ and time $t_2$.

Figure 3:
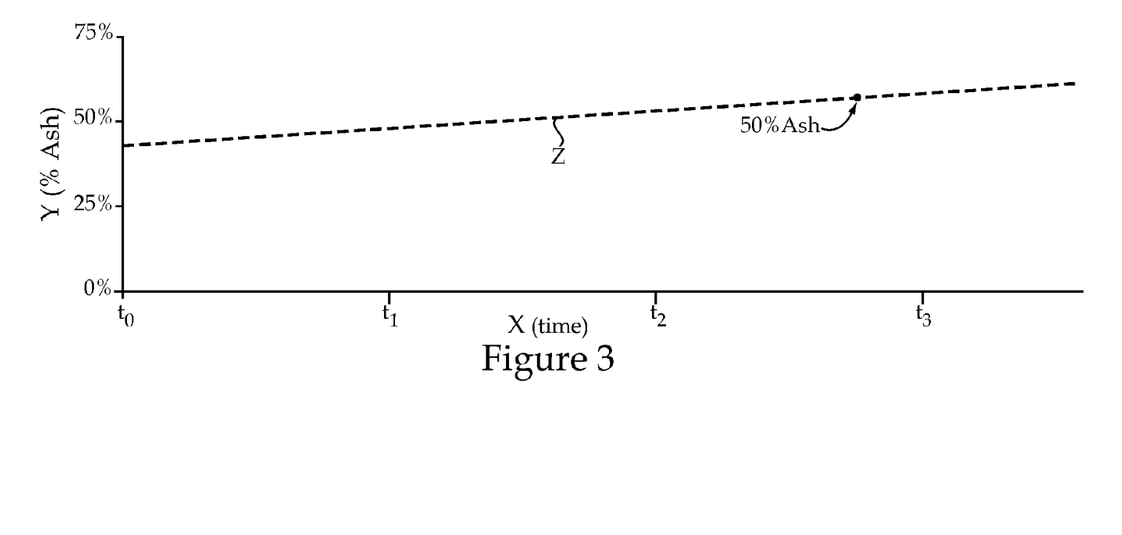
FIG. 3 is a graph illustrating ash loading in a diesel particulate filter over time.

Each of signals $P_1$, $P_2$, and $P_3$ may also be soot-responsive, however, signals $P_1$, $P_2$, and $P_3$, represent RF frequencies or RF frequency bands whose attenuation is responsive to ash, as well as responsive to soot. Thus, differences among signals $P_1$, $P_2$, and $P_3$, and differences relative to signals $Q_1$, $Q_2$, and $Q_3$, may be based at least in part on a response to trapped ash within filter 22. Referring to FIG. 3, there is shown a curve Z representing an increasing relative ash loading state of diesel particulate filter 22 from time $t_0$ to time $t_3$. The relative extent of ash load increase from time $t_0$ to time $t_3$ is somewhat exaggerated for illustration from what might actually occur given the slow rate of ash accumulation in comparison with soot accumulation in many instances. From time $t_0$ to time $t_1$ filter 22 may be understood as being in a lower ash condition. From time $t_1$ to time $t_2$ filter 22 may be understood as being in a medium ash condition. From time $t_2$ to time $t_3$ filter 22 may be understood as being in a higher ash condition. Although the illustration in FIG. 2 may be understood to depict each of the lower ash condition, medium ash condition, and higher ash condition, as occurring in separate soot loading cycles, a lower, medium, and higher ash condition might also be understood to occur during each individual soot loading cycle. For instance, the time duration from time $t_0$ to time $t_1$ could be characterized as having each of a lower ash condition, a medium ash condition, and a higher ash condition. It may thus be appreciated that "lower ash," "medium ash," and "higher ash" are used herein in purely relative terms. A 0% ash loading state could be a lower ash condition, a 1% ash loading state could be a medium ash condition, and a 2% ash loading state could be a higher ash condition. Likewise, a 25% ash loading state could be a lower ash condition, a 50% ash loading state could be a medium ash condition, and so on.

It may be noted that a pattern of decreasing sensed signal strength of signals $P_1$, $P_2$, and $P_3$, is different over time. Relative attenuation of the signals differs as soot load increases, and in particular an attenuation of signal $P_2$ is reduced as compared to signal $P_1$, while an attenuation of signal $P_3$ is reduced as compared to signals $P_1$ and $P_2$. These differences are due at least in part to the increasing ash load over time. Another way to understand the phenomena depicted in FIG. 2, is that signals $P_1$, $P_2$, and $P_3$, may tend to saturate or begin to saturate differently based on increasing ash load in the diesel particulate filter. A normalized signal trace for sensed signal strength for a saturated signal in the presently described context may appear asymptotic. Still another way to understand the phenomenon, is that the degree of loss in signal strength experienced by a signal which is approaching saturation may decrease over time. By monitoring received RF signal strength, data indicative of saturation may be obtained, and leveraged to determine a need for filter cleaning, as further described herein. This signal behavior of trending toward saturation, at least under certain soot loading conditions may further be understood as an ash response of transmitted RF in a frequency band which includes signals $P_1$, $P_2$ and $P_3$. Since the presence of soot may also influence signal attenuation of signals $P_1$, $P_2$, and $P_3$, the differing ash response among the signals tends to become more apparent where soot load is relatively higher. Signals $Q_1$, $Q_2$, $Q_3$ do not tend to exhibit this ash-responsive behavior. The use of different frequencies and/or different frequency bands for signals $Q_1$, $Q_2$, $Q_3$ versus $P_1$, $P_2$, and $P_3$ is responsible for the differing signal attenuation behavior in the presence of ash and soot, as further described herein.

As alluded to above, a sensed strength of signals $Q_1$, $Q_2$, and $Q_3$ may be expected to be relatively consistent at similar soot loading conditions regardless of the presence of ash. For example, sensed strength of signals $Q_1$, $Q_2$, and $Q_3$ at 80% soot load may be expected to be approximately the same during each of the illustrated soot loading cycles regardless of ash load, at least where confounding factors other than either soot or ash load are ignored. Sensed strength of signals $P_1$, $P_2$, and $P_3$, however, will tend not to have this consistency. Since ash tends to accumulate much more slowly than soot in a diesel particulate filter, over a time duration that may include many soot loading cycles sensing of ash-responsive signals can be expected to indicate a change in relative ash loading state. In a passively regenerated filter strategy, detecting ash might take place in an analogous manner, but the time duration over which a change in ash loading state is observed might not be readily described as having discrete soot loading cycles. Thus, a graph analogous to FIG. 2 for a passively regenerated system would likely appear different.

In one embodiment, a difference in received signal strength data between the ash-responsive signals and the ash-insensitive signals may be leveraged to detect ash in filter 12. In particular, sensor data indicative of signal attenuation of one or more of signals $P_1$, $P_2$, and $P_3$ may be compared with sensor data indicative of signal attenuation of one or more of signals $Q_1$, $Q_2$, and $Q_3$. For example, a difference between the sensor data for signal $P_3$ and the sensor data for signal $Q_3$ may indicate that a relative ash loading state of filter 22 has passed a 50% ash loading threshold, or a 50% relative ash loading state. In other instances, differences between ash-responsive and ash-insensitive signals might indicate passing a 10% ash loading threshold, a 25% ash loading threshold, or some other threshold. One practical implementation strategy includes detecting a change in relative ash loading state among a finite number of relative ash loading states of filter 22. The finite number might include five, such as 0%, 25%, 50%, 75% and 100%, relative ash loading states, for example.

Signal characteristics such as the differences in sensed signal strength described herein which indicate a relative ash loading state, or a change in relative ash loading state, may be determined empirically. For example, filter 22 might be operated to trap ash and soot from engine exhaust, and RF signals transmitted through filter 22, and transmitted signal strength sensed, at a plurality of different times, corresponding to a plurality of different soot loading and ash loading conditions. Filter 22 might be physically examined at each of the different ash and soot loading conditions to determine sensed signal strength conditions which are indicative of the parameters of interest. Tests conducted at, say, 10% ash load and 80% soot load, 20% ash load and 80% soot load, 30% ash load and 80% soot load, and so on, may thus reveal what differences in sensed signal strength, attenuation, rate of change in sensed signal strength, or other factors, can be associated with relative ash loading state. It should still further be appreciated that any of signals $P_1$, $P_2$, or $P_3$, may also be compared with one another to glean information indicative of ash loading state or a change in ash loading state. For instance, in some instances attenuation of signal $P_3$ as compared to signal $P_2$ may indicate that an ash threshold such as a 50% ash threshold has been or soon will be passed. It is thus expected that transmitting and sensing an ash-responsive signal at an earlier time, in a lower ash condition, may yield data such as signal strength data which may be compared with data for another ash-responsive signal transmitted and sensed at a later time, in a higher ash condition, to detect a quantity or relative quantity of trapped ash or a change in the quantity or relative quantity of trapped ash. Most practical implementation strategies outside the laboratory will include detecting ash at least in part by comparing signal attenuation characteristics between ash-responsive and ash-insensitive signals, rather than relying solely on signal characteristics of ash-responsive signals, as the ash-insensitive signal data can provide a reference point to enable confidence that different signal characteristics observed in the ash-responsive signals are indeed the result of ash and not some other factor As discussed above, the difference in signal attenuation between the ash-responsive signals and the ash-insensitive signals tends to become increasingly apparent in the presence of increased quantities of trapped soot. It may thus be desirable to transmit the ash-responsive signals during a higher soot condition of filter 22, during which the ash-insensitive RF signals are also transmitted. A lower soot condition might include a soot loading condition less than an 80% soot load, and a higher soot condition might include a soot loading condition at or above an 80% soot load. It may also be desirable to transmit the ash-responsive RF signals during both a lower soot condition and a higher soot condition, for example, taking snapshots of received signal strength of the ash-responsive RF signals at the different soot conditions and comparing the data with data for ash-insensitive RF signals transmitted at the same times. While 80% is one example threshold between a lower soot condition and a higher soot condition, some other higher or lower soot loading percentage might also be used.

As mentioned above, each of the RF signals described herein may include transmission of an RF frequency band, which includes a plurality of different RF frequencies, one time, a plurality of times, or continuously. In one embodiment, each of signals $Q_1$, $Q_2$, and $Q_3$ may include a relatively higher frequency band between about 500 MHz and about 3000 MHz, and which may be between about 2100 MHz and about 2500 MHz. Each of signals $P_1$, $P_2$, and $P_3$ may include a relatively lower frequency band between about 500 MHz and about 3000 MHz, and which may be between about 700 MHz and about 900 MHz. As used herein, the term "about" may be understood in the context of a number of significant digits. Thus, about 500 MHz means between 495 MHz and 504 MHz, for example. Each of a plurality of frequencies within the respective frequency bands may be transmitted, for example, for a time period of 1 millisecond, and then the transmission sequence repeated. Thus, each of signals $Q_1$, $Q_2$, and $Q_3$, might include a transmission sequence including a 1 millisecond transmission at 2100 MHz, a 1 millisecond transmission at 2101 MHz, a 1 millisecond transmission at 2102 MHz, and so on, up to and including 2500 MHz. The sequence can be repeated continuously or periodically. A similar strategy may be used for signals $P_1$, $P_2$, and $P_3$, including each whole number frequency from 700 MHz to 900 MHz. Sensing of the transmitted frequency bands may follow analogous protocols.

In some instances, it may be necessary to transmit each frequency band or discrete frequency which includes each ash-responsive signal, and each band or discrete frequency which includes each ash-insensitive signal only one or two times to obtain data sufficient to detect a relative ash loading state of filter 22. Further, while the present disclosure contemplates calculating values associated with signal attenuation for each of the signals, in other embodiments discrete bits of data corresponding to sensed signal strength may be used. For example, each of signals $P_1$, $P_2$, and $P_3$ might include a single frequency band transmission at a predetermined time or predetermined soot loading condition. Sensed signal strength data for the single transmission might be compared with sensed signal strength data for a single ash-insensitive frequency band transmission occurring at the predetermined time or predetermined soot loading condition. Since an outputted signal strength may be determined from RF transmitter 34, it may thus be understood that data received from RF sensor 36 may be indicative of signal attenuation of the corresponding RF signal, and thus indicative of relative ash loading state, even where signal attenuation itself is not calculated or otherwise determined or inferred.

One method of correlating a difference between data for the ash-responsive signals and data for the ash-insensitive signals with ash loading includes determining a mean value of sensed RF signal strength in the frequency band transmissions which include the respective signals. The mean values might include an average of received signal strength for one or more frequencies over time, or they might include an average of received signal strength for "snapshots," such as multiple sampling periods of 1 millisecond, corresponding to a 1 millisecond RF transmission of one or more frequencies. The mean values for the ash-responsive signals may be compared with mean values for the ash-insensitive signals, or even potentially with a previously stored empirically based or simulation based value, for example, which is known to be indicative of a relative ash loading state in diesel particulate filter 22, to determine relative ash loading state or a change in relative ash loading state.

In one practical implementation strategy, multiple snapshots of data, such as consecutive 1 millisecond sensing periods, indicative of attenuation of the ash-responsive signals and the ash-insensitive signals may be taken beginning at a filter state having greater than about 70% soot load. The mean values may be calculated based on received signal strength in each of these snapshots, and compared to detect ash. Thus, in the FIG. 2 example, a sampling period might commence, during each of the soot loading cycles, shortly before reaching on 80% soot load, and continuing until regeneration is commanded approximately at times $t_1$, $t_2$, and $t_3$. The difference between mean values for signal $P_3$ and signal $Q_3$ can indicate that an ash threshold such as a 50% ash loading state has been reached or passed. Detecting any other ash loading threshold can occur in an analogous manner.

Industrial Applicability

Figure 4:
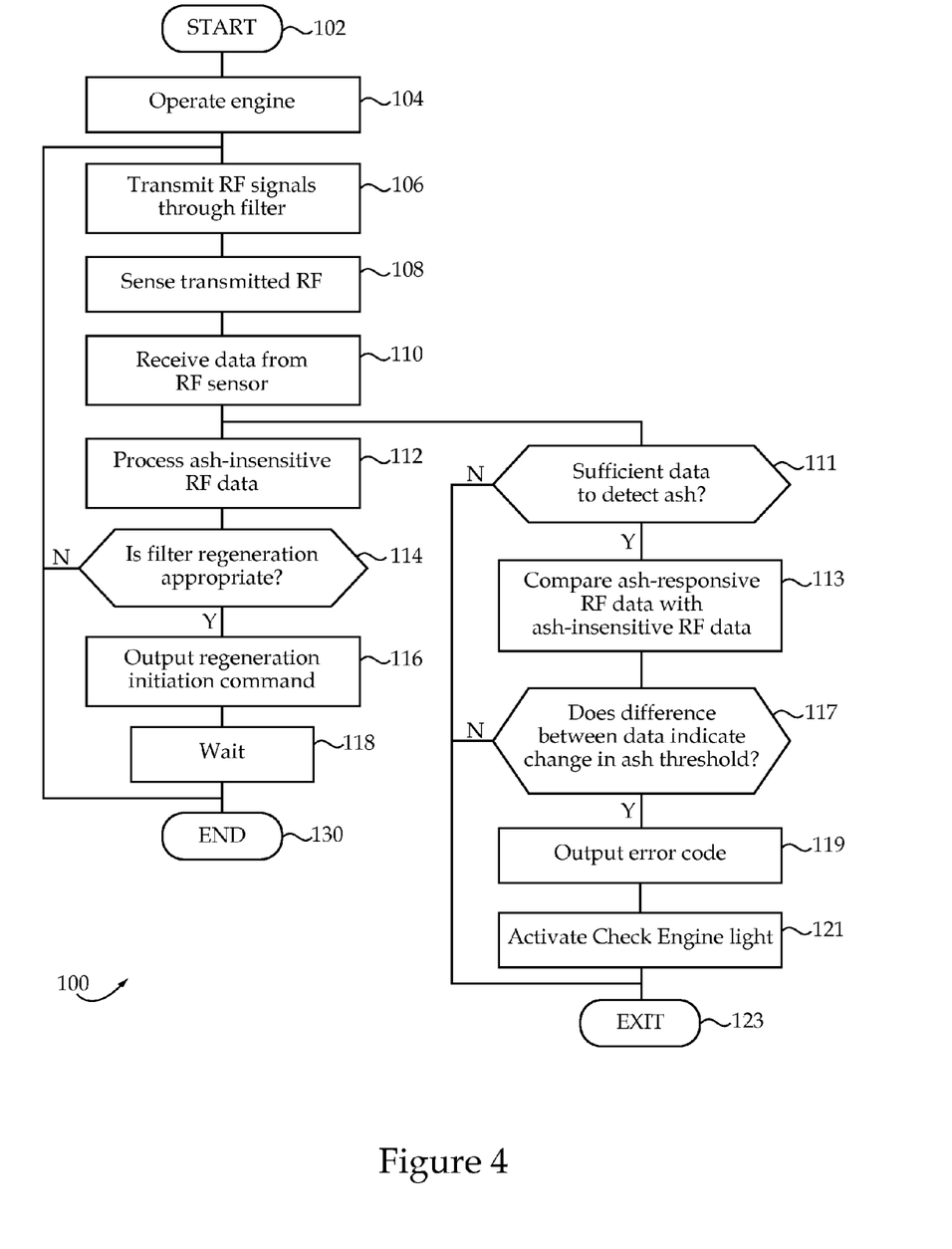
FIG. 4 is a flowchart illustrating a control process according to one embodiment.

Referring to FIG. 4, there is shown a flowchart 100 illustrating a control process according to the present disclosure. Process 100 may Start at step 102, and may then proceed to step 104 where engine 14 is operated. Operating engine 14 may produce exhaust gases containing ash and soot which are passed to filter 22 and trapped in filter medium 30. Passing exhaust gases thusly may increase a quantity of trapped soot and ash within filter 22 over time. From step 104, the process may proceed to step 106 to transmit RF signals through filter 22. As described herein, the RF signals transmitted through filter 22 may be attenuated in response to ash and/or soot trapped in filter 22. The ash-insensitive RF signals may attenuate at least predominantly in response to trapped soot. The ash-responsive RF signals may attenuate in response to both trapped soot and trapped ash. From step 106, the process may proceed to step 108 to sense transmitted RF, and thenceforth to step 110 wherein electronic control unit 40 receives data from RF sensor 36. Steps 106 through 110 may be understood as gathering data during one soot loading cycle, as described herein.

From step 110, process 100 may proceed in parallel to execute a soot monitoring routine, steps 112-118, and an ash monitoring routine, steps 111-121. At step 112, electronic control unit 40 may process data indicative of signal attenuation of the ash-insensitive RF signal, such as received signal strength data. This might include, for example, determining a soot loading state of filter 22 responsive to signal attenuation of any of signals $Q_1$, $Q_2$, and $Q_3$, via known techniques. From step 112, process 100 may proceed to step 114 to query whether filter regeneration is appropriate. Those skilled in the art will be familiar with different factors making filter regeneration appropriate or not. If no, the process may loop back to execute step 106 again, or might simply exit. If yes, the process may proceed to step 116 to command execution of a filter regeneration cycle via outputting a regeneration initiation command. Outputting the regeneration initiation command may include outputting a signal from electronic control unit 40 to regeneration initiation mechanism 32. From step 116, the process may proceed to step 118 to execute a wait cycle, and thenceforth could return to loop back through the steps of process 100 again, or may end at step 130.

Execution of the ash monitoring routine may include determining at step 111 whether there is sufficient data to detect ash. This may include, for example, checking whether any difference, or at least a threshold difference, between signal attenuation of ash-responsive RF signals and ash-insensitive RF signals is observed. At step 111, it might also be queried whether a predetermined time has elapsed since filter 22 has been cleaned of ash. If no, the process may exit at step 123. If yes, the process may proceed to step 113. Step 113 may include comparing data for ash-responsive RF signals with data for ash-insensitive RF signals. Comparing the data at step 113 may include comparing data for RF signals transmitted during one soot loading cycle, such as comparing data for signal $P_2$ with data for signal $Q_2$ or comparing data for signal $P_3$ with data for signal $Q_3$. From step 113, process 100 may proceed to step 117 to query whether a difference between the data indicates a change in ash threshold, such as passing a 25%, 50%, or 75% ash threshold. If no, the process may proceed to exit at step 123. If such a change is determined at step 117, the process may proceed to step 119 to responsively output an ash loading status signal. The ash loading status signal may include a signal generated by control unit 40 which is logged in a computer readable memory with a time stamp, for example, recording a determined change in relative ash loading state. Outputting the ash loading status signal may further include outputting an error code, if a determined change in filter ash loading state satisfies filter servicing criteria. Satisfaction of filter servicing criteria may include, for example, an instance where ash load has passed a predetermined threshold, such as 75%, 90%, etc. From step 119, process 100 may proceed to step 121 to generate a filter cleaning alert, such as by switching filter service indicator 46 from a first indicator state to a second indicator state responsive to the error code. As described above, switching the state of filter service indicator 46 may include activating or turning on the check engine light of machine 10. From step 121, process 100 may proceed to exit at step 123.

The present disclosure leverages previously unrecognized phenomena relating to the transmission and sensing of RF signals in a diesel particulate filter. Certain prior strategies tended to assume that RF signals were either categorically insensitive to ash, or that ash-responsive behavior was only exhibited under certain narrow circumstances. In contrast, the present disclosure is applicable outside of the context of such circumstances, and can instead leverage RF signal behavior to detect ash under comparatively dirty filter conditions, for example during an operating period of an engine in which quantities of both trapped soot and trapped ash are increasing. Moreover, the present disclosure enables discriminating between different ash loading states, rather than only between a zero ash state and an ash loaded state. While the present disclosure proposes certain frequency bands as ash-responsive, ash-insensitive, soot responsive, etc., it is contemplated that other frequency bands than those specifically disclosed herein and/or certain individual frequencies may exhibit the desired behavior, and could be determined empirically in light of the teachings set forth herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of detecting ash in a diesel particulate filter comprising the steps of:
   transmitting an RF signal through a diesel particulate filter containing both soot and ash during each of a lower soot loading condition and a higher soot loading condition of the diesel particulate filter;
   attenuating the transmitted RF signal within the diesel particulate filter during each of the lower and higher soot loading conditions, such that a strength of the transmitted RF signal once attenuated is inversely related to an amount of the soot; and
   generating a filter cleaning alert via an indicating device located in an operator control station of a machine, responsive to a difference in an extent of the attenuation relative to the amount of the soot at the lower and higher soot loading conditions, where the difference is indicative of at least one of an ash loading state and a change in an ash loading state of the diesel particulate filter.

2. The method of claim 1 wherein the RF signal is a first RF signal, and further comprising the steps of transmitting an ash-insensitive RF signal through the diesel particulate filter, attenuating the transmitted ash-insensitive RF signal, and comparing data indicative of signal attenuation of the first RF signal with data indicative of signal attenuation of the ash-insensitive RF signal.

3. The method of claim 2 further comprising a step of detecting a change in relative ash loading state of the diesel particulate filter among a finite number of relative ash loading states, and wherein the step of generating further includes generating the filter cleaning alert responsive to detecting the change.

4. The method of claim 3 further comprising the steps of increasing an amount of ash in the diesel particulate filter at least in part by passing exhaust from an internal combustion diesel engine through the diesel particulate filter, and reducing attenuating the first RF signal in response to increasing the amount of ash.

5. A method of determining an ash loading state of a diesel particulate filter comprising the steps of:
   transmitting an ash-responsive RF signal through a filter medium of a diesel particulate filter containing both soot and ash, during a soot loading cycle;
   transmitting an ash-insensitive RF signal through the filter medium, during the soot loading cycle;
   receiving data indicative of signal attenuation of the ash-responsive RF signal, and data indicative of signal attenuation of the ash-insensitive RF signal;
   comparing the data for the ash-responsive RF signal with the data for the ash-insensitive RF signal; and
   outputting an ash loading status signal responsive to a difference between the data for the ash-responsive RF signal and the data for the ash-insensitive RF signal.

6. The method of claim 5 further comprising a step of determining the difference between the data is indicative of a change in filter ash loading state among a finite number of filter ash loading states, and wherein the step of outputting further includes outputting the ash loading status signal responsive to the step of determining.

7. The method of claim 6 wherein the step of outputting further includes outputting an error code, if the change in filter ash loading state satisfies filter servicing criteria.

8. The method of claim 7 further comprising a step of activating a check engine light responsive to the error code.

9. The method of claim 6 wherein each of the steps of transmitting includes transmitting a different RF frequency band.

10. The method of claim 9 further comprising the steps of sensing transmitted RF in each of the different RF frequency bands, and determining mean values which are based on sensed signal strength in each of the different RF frequency bands.

11. The method of claim 10 wherein the step of comparing further includes comparing the determined mean values.

12. The method of claim 5 wherein the step of receiving further includes receiving data indicative of saturation of the ash-responsive RF signal, and wherein the step of outputting further includes outputting an error code responsive to the data indicative of saturation.

13. A method of operating a machine having an internal combustion diesel engine and a diesel particulate filter comprising the steps of:
   transmitting an ash-insensitive RF signal through the diesel particulate filter, during a soot loading cycle where the diesel particulate filter contains both soot and ash;
   transmitting an ash-responsive RF signal through the diesel particulate filter, during the soot loading cycle where the diesel particulate filter contains both soot and ash;
   attenuating each of the ash-insensitive RF signal and the ash-responsive RF signal; and
   detecting trapped ash in the diesel particulate filter responsive to a difference in attenuation between the ash-responsive RF signal and the ash-insensitive RF signal.

14. The method of claim 13 further comprising a step of increasing a quantity of trapped soot and ash within the diesel particulate filter, at least in part by passing exhaust gases from the internal combustion diesel engine through the diesel particulate filter, and wherein the step of detecting trapped ash includes detecting trapped ash during increasing the quantity of trapped soot and ash.

15. The method of claim 14 wherein the step of attenuating further includes attenuating each of the ash-insensitive RF signal and the ash-responsive RF signal in response to trapped soot.

16. A method of operating a machine having an internal combustion diesel engine and a diesel particulate filter comprising the steps of:
   transmitting an ash-insensitive RF signal through the diesel particulate filter;
   transmitting an ash-responsive RF signal through the diesel particulate filter;
   attenuating each of the ash-insensitive RF signal and the ash-responsive RF signal;
   detecting trapped ash in the diesel particulate filter responsive to a difference in attenuation between the ash-responsive RF signal and the ash-insensitive RF signal;
   increasing a quantity of trapped soot and ash within the diesel particulate filter, at least in part by passing exhaust gases from the internal combustion diesel engine through the diesel particulate filter;
   wherein the step of detecting trapped ash includes detecting trapped ash during increasing the quantity of trapped soot and ash;
   wherein the step of attenuating further includes attenuating each of the ash-insensitive RF signal and the ash-responsive RF signal in response to trapped soot; and
   wherein the step of transmitting further includes transmitting each of the ash-insensitive RF signal and the ash-responsive RF signal during each of a lower soot loading condition and a higher soot loading condition of the diesel particulate filter, and wherein the step of detecting further includes detecting a relative amount of trapped ash responsive to a difference in signal attenuation between the RF signals at each of the lower and higher soot loading conditions.

17. The method of claim 13 further comprising the steps of:
sensing transmitted RF in a first RF frequency band which includes an ash-insensitive RF frequency, and a second, different RF frequency band which includes an ash-responsive RF frequency;
commanding executing filter regeneration responsive to sensing transmitted RF in the first frequency band; and
wherein the detecting step further includes commanding switching a filter service indicator from a first indicator state to a second indicator state, responsive to a difference in sensed signal strength between the first and second RF frequency bands.

18. The method of claim 17 wherein each of the sensing, commanding, and detecting steps occurs during the same soot loading cycle.

19. A diesel particulate filter system comprising:
a filter housing having an exhaust inlet, and an exhaust outlet;
a filter medium positioned within the filter housing between the exhaust inlet and the exhaust outlet, and configured to trap soot and ash from operating an internal combustion diesel engine fluidly connected with the exhaust inlet;
an RF transmitter configured to transmit RF signals through the filter medium;
an RF sensor configured to sense RF energy transmitted through the filter medium;
an electronic control unit coupled with the RF transmitter and the RF sensor, and being configured to receive data from the RF sensor indicative of signal attenuation of ash-responsive RF signals and ash-insensitive RF signals transmitted through the filter medium during the same soot loading cycle in which both soot and ash are trapped within the filter medium, the electronic control unit being further configured to compare the data for the ash-responsive RF signals with the data for the ash-insensitive RF signals and responsively output a filter ash loading status signal.

20. The diesel particulate filter system of claim 19 further comprising a filter service indicator coupled with the electronic control unit, and having a first indicator state and a second indicator state, the electronic control unit being further configured to receive data from the RF sensor indicative of signal saturation of the ash-responsive RF signal and responsively switch the filter service indicator from the first indicator state to the second indicator state.

* * * * *